US008365466B1

(12) United States Patent
Storey

(10) Patent No.: US 8,365,466 B1
(45) Date of Patent: Feb. 5, 2013

(54) HYDROPONIC PRODUCE DISPLAY APPARATUS

(76) Inventor: Nathaniel Storey, Laramie, WY (US)

( * ) Notice: Subject to any disclaimer, the term of this patent is extended or adjusted under 35 U.S.C. 154(b) by 0 days.

(21) Appl. No.: 13/066,630

(22) Filed: Apr. 20, 2011

Related U.S. Application Data

(60) Provisional application No. 61/343,038, filed on Apr. 22, 2010.

(51) Int. Cl.
*A01G 31/06* (2006.01)
(52) U.S. Cl. .................. 47/62 C; 47/62 R; 47/82; 47/83
(58) Field of Classification Search .................. 47/59 R, 47/62 R, 62 A, 62 C, 62 N, 63, 65.5, 65, 47/66.6, 66.7, 67, 66.1, 79, 82, 83, 39, 41.01, 47/48.5
See application file for complete search history.

(56) References Cited

U.S. PATENT DOCUMENTS

| 4,075,785 A | 2/1978 | Jones |
| 4,189,868 A | 2/1980 | Tymchuck et al. |
| 4,419,843 A * | 12/1983 | Johnson, Sr. ...................... 47/82 |
| 4,551,943 A | 11/1985 | Pas |
| 4,832,607 A | 5/1989 | Dorrell |
| 4,899,487 A | 2/1990 | Brownlee |
| 4,986,027 A * | 1/1991 | Harvey .......................... 47/59 R |
| 5,044,118 A | 9/1991 | Ferris |
| 5,363,594 A * | 11/1994 | Davis ................................ 47/82 |
| 5,367,823 A | 11/1994 | Ferris |
| 5,555,676 A * | 9/1996 | Lund ................................ 47/82 |
| 5,771,634 A | 6/1998 | Fudger |
| 5,806,241 A | 9/1998 | Byland et al. |
| 5,862,628 A | 1/1999 | Takashima |
| 6,012,250 A | 1/2000 | Ray |
| 6,314,675 B1 | 11/2001 | Costa |
| 6,381,901 B1 | 5/2002 | Friedman |
| 6,499,249 B1 * | 12/2002 | Luijkx .......................... 47/41.01 |
| 6,634,138 B2 * | 10/2003 | Katzman ............................ 47/79 |
| 6,725,601 B2 | 4/2004 | Chick |
| 6,727,091 B2 * | 4/2004 | Darlington ................. 435/299.1 |
| 7,055,282 B2 * | 6/2006 | Bryan, III ..................... 47/62 R |
| 7,080,482 B1 | 7/2006 | Bradley |
| 7,143,544 B2 | 12/2006 | Roy |
| 7,243,460 B2 | 7/2007 | Darlington |
| 7,331,458 B2 | 2/2008 | Scott |
| 7,448,164 B1 | 11/2008 | McCabe |
| 7,516,574 B2 * | 4/2009 | Gottlieb et al. ............... 47/62 R |
| 7,877,927 B2 | 2/2011 | Roy et al. |
| 2009/0007486 A1 * | 1/2009 | Corradi ......................... 47/62 R |
| 2011/0107667 A1 * | 5/2011 | Laurence et al. .............. 47/59 S |

* cited by examiner

*Primary Examiner* — T. Nguyen
(74) *Attorney, Agent, or Firm* — Emery L. Tracy

(57) ABSTRACT

A hydroponic produce display apparatus for in-store and market display of plants is provided. The hydroponic produce display apparatus comprises a basin having an open top with the basin holding a volume of liquid. A cover is positioned on the open top of the basin with the cover being permeable to liquid. A display backing is provided having a first end, a second end opposite the first end, a first side, and a second side opposite the first side. The first end of the display backing is mounted over the open top of the basin with the display backing extending vertically from the basin. Mounting mechanisms cooperate with the display backing for mounting the plants to the display backing. A liquid introduction mechanism introduces liquid to the plants mounted to the display backing. A liquid transfer mechanism moves liquid from the basin to the liquid introduction means. Excess liquid from the liquid introduction means not absorbed by the plants is moved into the basin for transfer back to the liquid introduction means.

10 Claims, 8 Drawing Sheets

HYDROPONIC PRODUCE DISPLAY APPARATUS

The present application claims benefit of priority of provisional patent application Ser. No. 61/343,038, filed on Apr. 22, 2010, entitled "Hydroponic Produce Display Apparatus".

BACKGROUND OF THE INVENTION

1. Field of the Invention

This invention relates generally to a hydroponic produce production and display apparatus and, more particularly, the invention relates to a hydroponic produce display apparatus allowing home, kitchen, in-store and market display and storage of unpicked, growing vegetables and herbs to consumers.

2. Description of the Prior Art

Traditionally, agricultural produce displayed in supermarkets, farmer's markets, or other venues has previously been harvested and transported, and as such often suffers wilting and cosmetic blemishes, damage to body and structure, loss of nutrition, and the resulting negative effects on consumption. By presenting living, growing crop plants in the marketplace showing none of the negative characteristics of harvest and transport, many of these hurdles to consumption can be overcome, and storage life of the harvested product increased dramatically. Additionally, presenting crops in a way that allows consumers to choose and harvest plants themselves introduces a positive tactile experience to consumers that contributes to a pleasing customer experience. Additionally, crop plants that are not picked in the marketplace are kept alive and healthy and can be returned with the production containers to the producer to be harvested and introduced to the market in a more traditional manner. The shelf life of live plants in such a system dramatically exceeds the shelf life of harvested vegetables and herbs.

SUMMARY

The present invention is a hydroponic produce display apparatus for in-store and market display of plants. The hydroponic produce display apparatus comprises a basin having an open top with the basin holding a volume of liquid. A cover is positioned on the open top of the basin with the cover being permeable to liquid. A display backing is provided having a first end, a second end opposite the first end, a first side, and a second side opposite the first side. The first end of the display backing is mounted over the open top of the basin with the display backing extending vertically from the basin. Mounting mechanisms cooperate with the display backing for mounting the plants to the display backing. A liquid introduction mechanism introduces liquid to the plants mounted to the display backing. A liquid transfer mechanism moves liquid from the basin to the liquid introduction means. Excess liquid from the liquid introduction means not absorbed by the plants is moved into the basin for transfer back to the liquid introduction means.

In addition, the present invention includes a hydroponic produce display apparatus for in-store and market display of plants. The hydroponic produce display apparatus comprises a basin for holding a volume of liquid. An opening is formed in the basin. A hydroponic container having a first end and a second end is provided. The first end of the hydroponic container cooperates with the opening in the basin with the plants growing within the hydroponic containers. Irrigation means move liquid from the basin to the second end of the hydroponic container wherein harvested hydroponic containers are exchanged with harvested containers.

The present invention further includes a method for in-store and market display of plants. The method comprises providing a basin for holding a volume of liquid, forming an opening in the basin, providing a hydroponic container having a first end and a second end, cooperating the first end of the hydroponic container with the opening in the basin, growing plants within the hydroponic containers, moving liquid from the basin to the second end of the hydroponic container, and exchanging the harvested hydroponic containers with unharvested hydroponic containers.

DETAILED DESCRIPTION OF THE PREFERRED EMBODIMENTS

Figure 1:
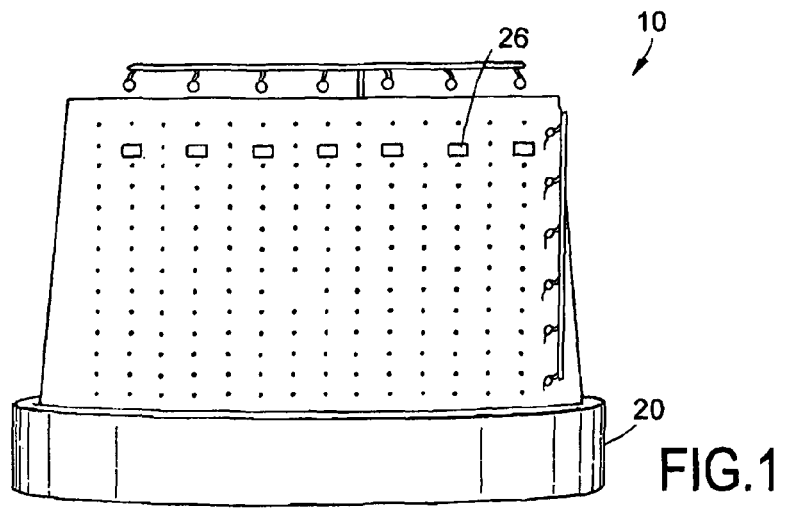
FIG. 1 is a front elevational view illustrating a hydroponic produce display apparatus, constructed in accordance with the present invention, with the display skirt, drainage trough with grate cover, display backing, male brackets, overhead sprayers, and horizontal trough drip irrigation systems.
Figure 2:
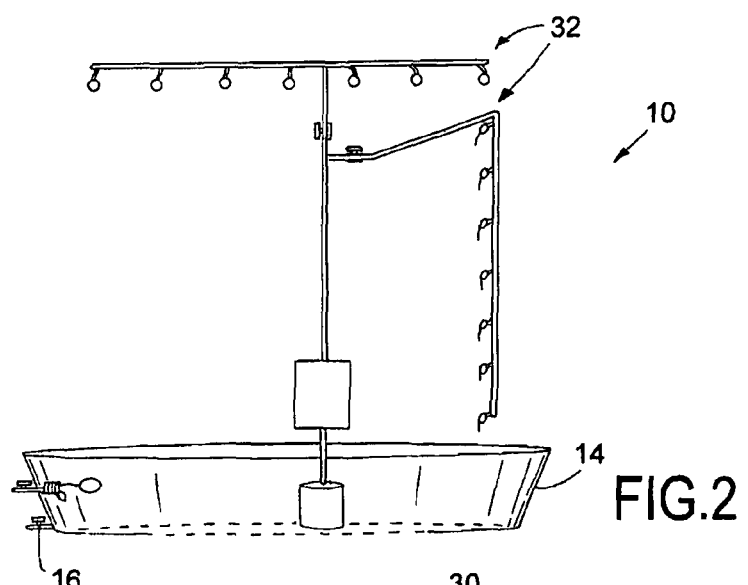
FIG. 2 is a front elevational view illustrating the plumbing and irrigation system of the hydroponic produce display apparatus of FIG. 1, constructed in accordance with the present invention, including inflow and outflow valves with flood valve, pump, ultraviolet light sterilizer, diversion valves, overhead sprayer system, and horizontal trough drip irrigation systems.
Figure 3:
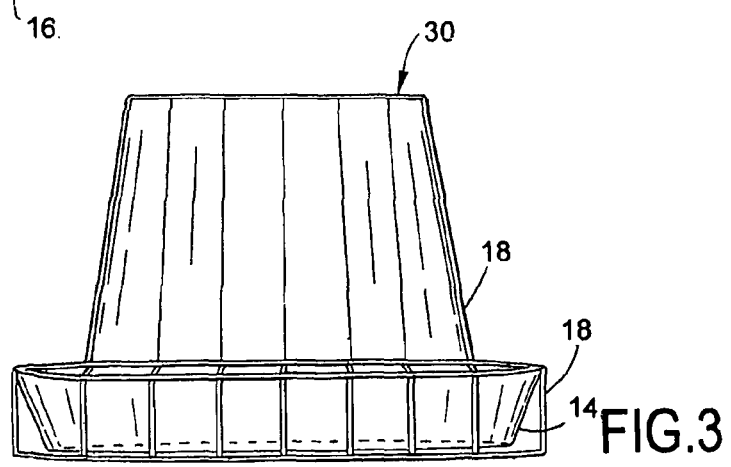
FIG. 3 is a front elevational view illustrating the structural framework of the hydroponic produce display apparatus of FIG. 1, constructed in accordance with the present invention.
Figure 4:
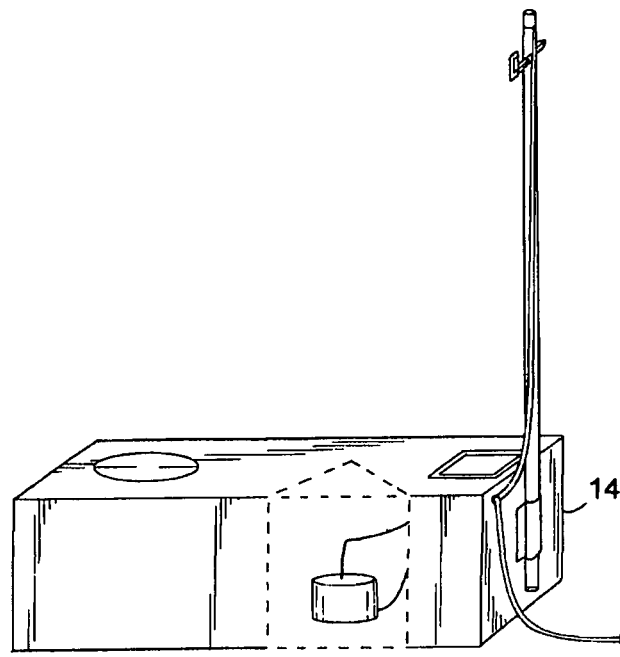
FIG. 4 is a perspective view illustrating another embodiment of the hydroponic produce display apparatus, constructed in accordance with the present invention, with the base tank, the pump, the electrical cord, the irrigation tubing extending to the sprayer/dripper head, the bracket for securing the vertical tower to the support arm, the hole to receive the excess irrigation solution, and the maintenance port.
Figure 5:
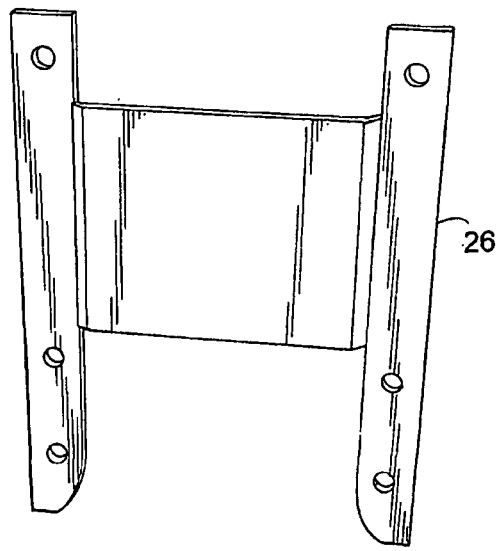
FIG. 5 is a front elevational view illustrating a bracket of the hydroponic produce display apparatus, constructed in accordance with the present invention.
Figure 6:
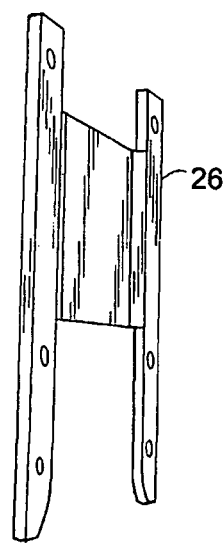
FIG. 6 is a perspective view illustrating the bracket of the hydroponic produce display apparatus, constructed in accordance with the present invention.
Figure 7:
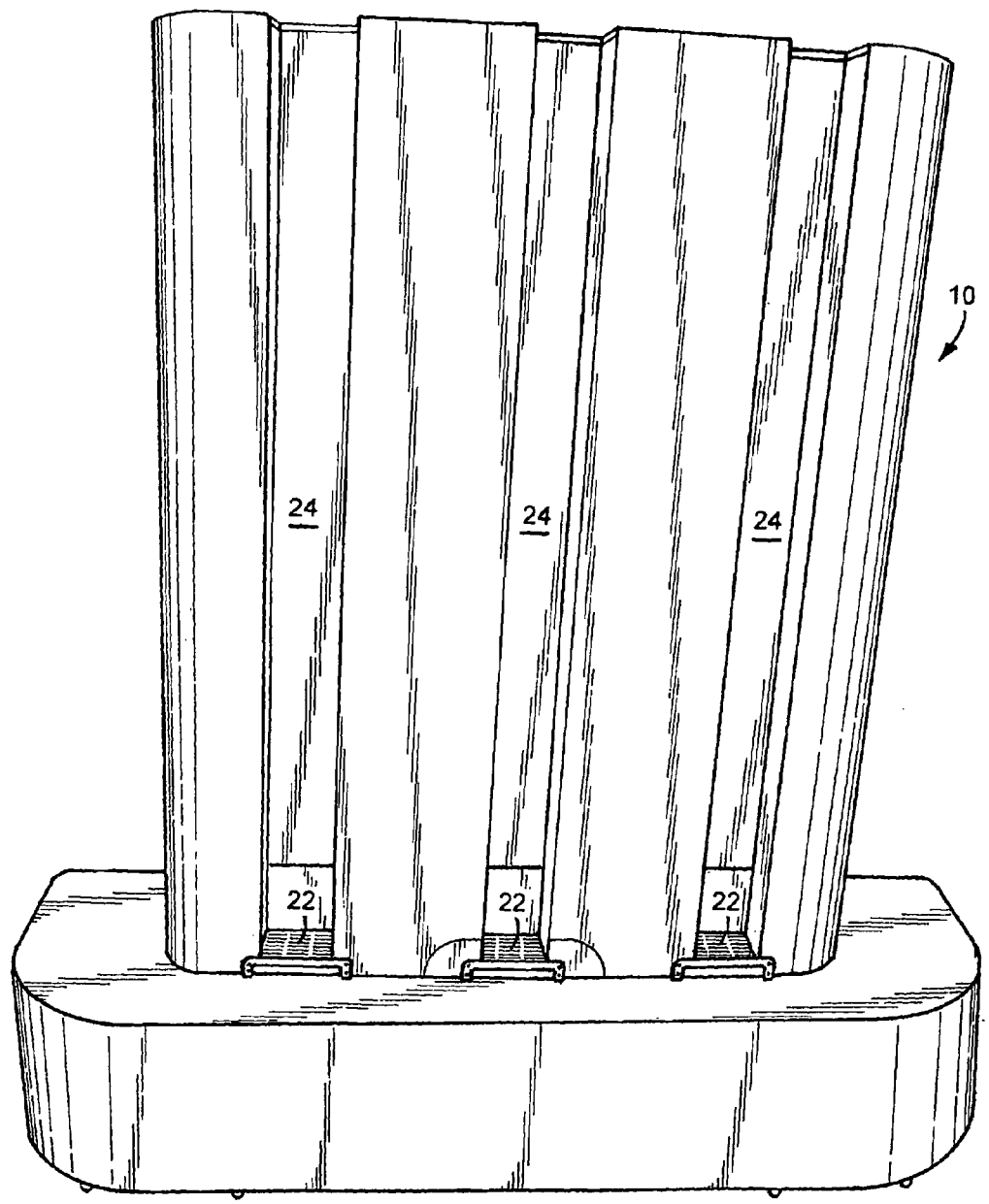
FIG. 7 is a front view illustrating the hydroponic produce display apparatus, constructed in accordance with the present invention, with inset channels allowing vertical hydroponic towers to stand flush with a face of the display apparatus.
Figure 8:
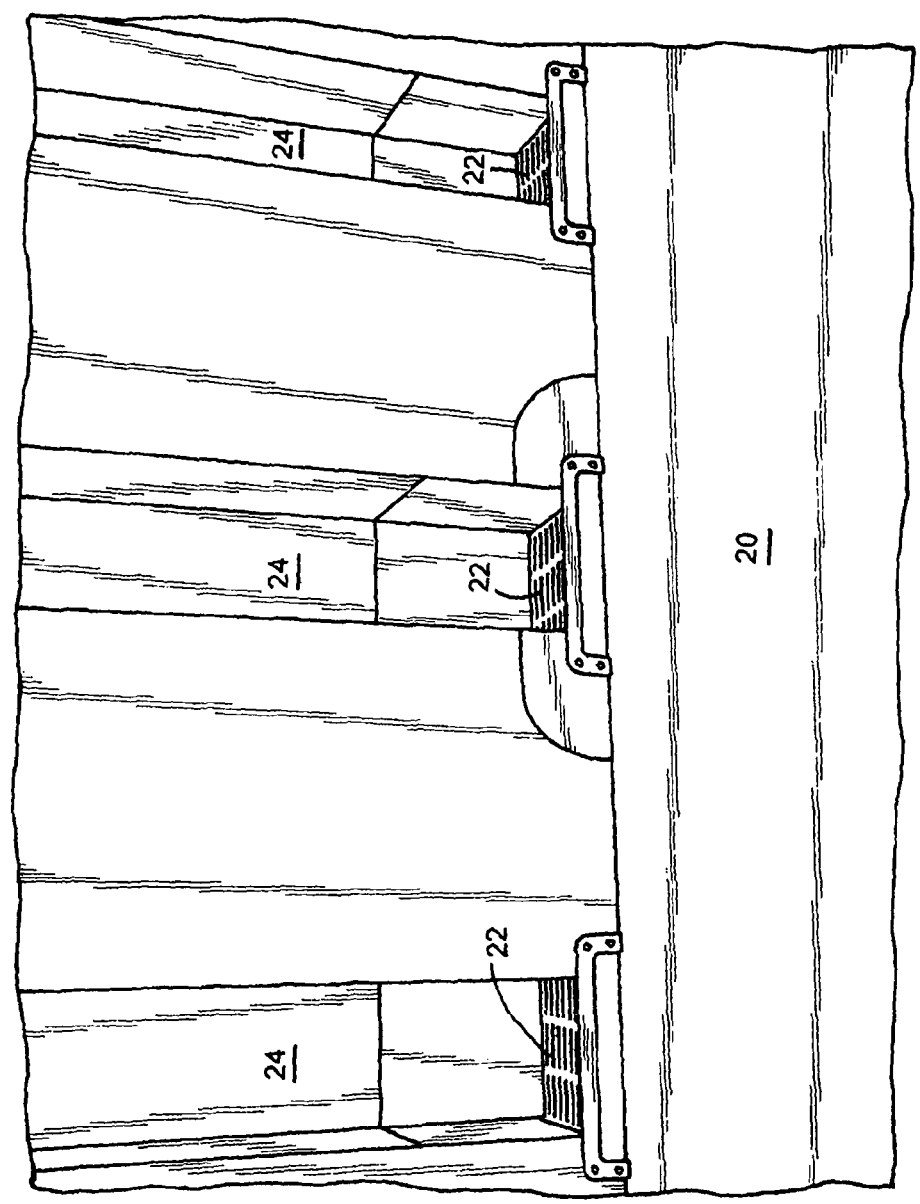
FIG. 8 is a front perspective view illustrating the hydroponic produce display apparatus, constructed in accordance with the present invention, with inset channels allowing vertical hydroponic towers to stand flush with the face of the display apparatus.
Figure 9:
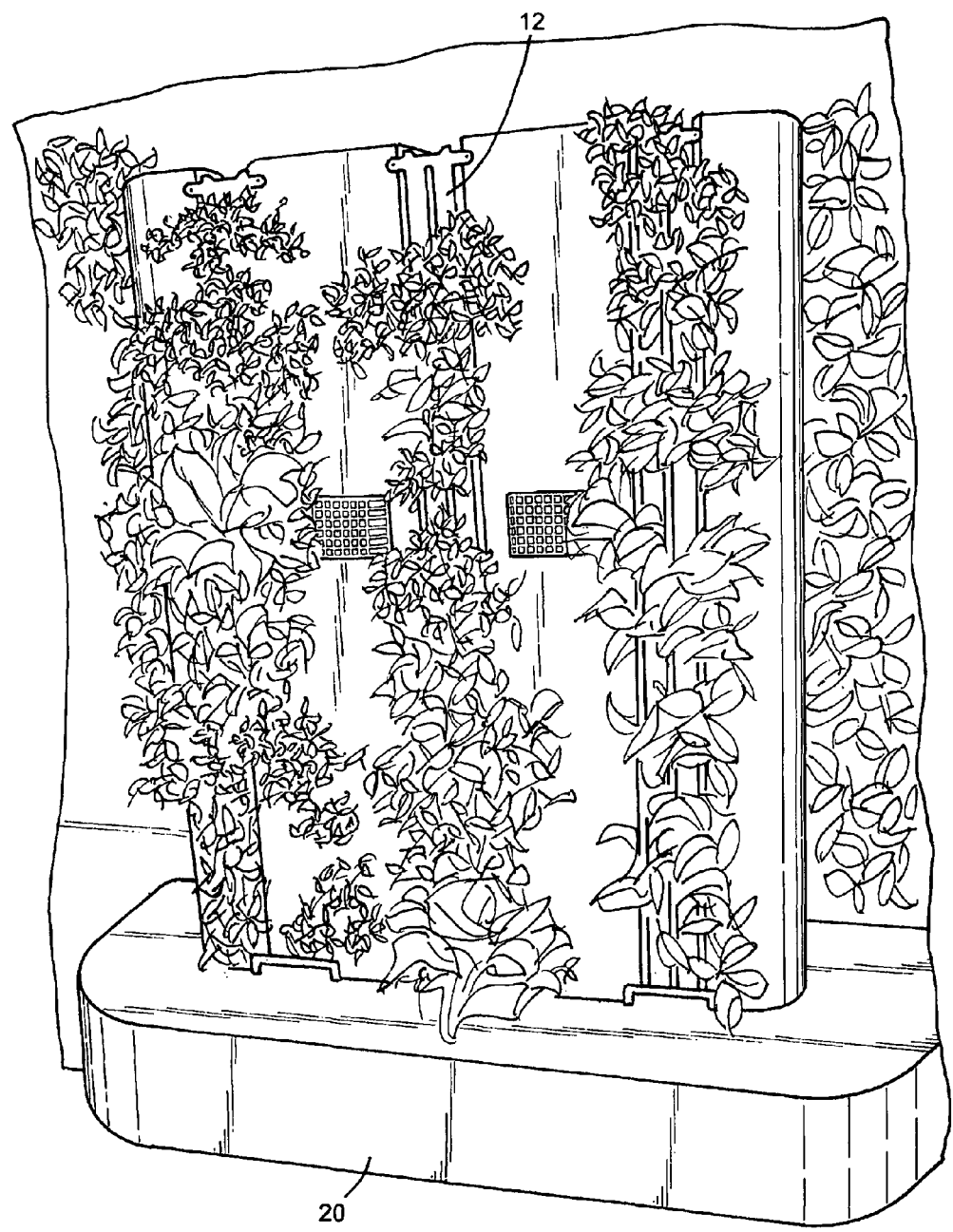
FIG. 9 is another front perspective view illustrating the hydroponic produce display apparatus, constructed in accordance with the present invention, with inset channels that allow vertical hydroponic towers to stand flush with a face of the display apparatus.
Figure 10:
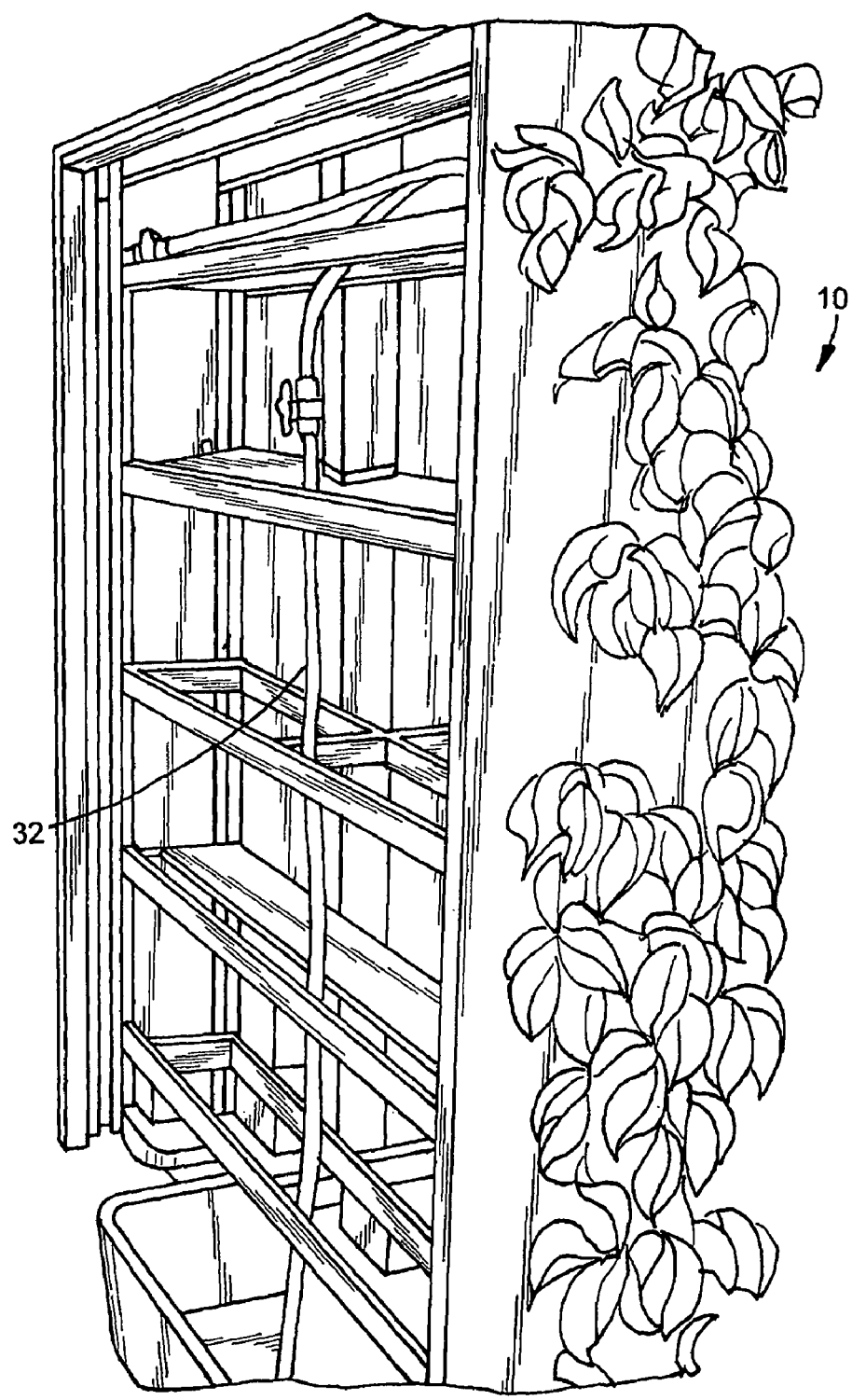
FIG. 10 is a rear perspective view illustrating the hydroponic produce display apparatus, constructed in accordance with the present invention, with inset channels that allow vertical hydroponic towers to stand flush with a face of the display apparatus.

As illustrated in FIGS. 1-12, the present invention is a hydroponic produce display apparatus, indicated generally at 10, allowing in-store and market display of unpicked, growing vegetables and herbs to consumers. The hydroponic produce display apparatus 10 described herein sustains plant life and vitality by supporting the irrigation and display of discreet, modular hydroponic production containers 12 in various forms, including nutrient film technique troughs, drip technique troughs, aeroponic tubes, and vertical hydroponic towers.

Being lightweight and portable in design, the hydroponic produce display apparatus 10 of the present invention is easily transported from market to market as well as being permanently or semi-permanently plumbed and plugged into electrical outlets for long-term displays or in-home use. Since hydroponic containers 12 on display are exchanged on a regular basis to ensure proper plant growth—and as such, the hydroponic produce display apparatus 10 described herein is designed primarily to sustain plant appearance and vitality until on-site harvest at the market or store, not to provide plant nourishment or promote plant growth. However, by utilizing a nutrient solution the system, some embodiments of the present invention may be used for home and commercial hydroponic production.

In one embodiment of the hydroponic produce display apparatus 10 of the present invention, the hydroponic produce display apparatus 10 utilizes a rectangular basin 14, rounded on the two narrow ends and varying in internal volume from fifteen (15 gal.) gallons to three (3 gal.) gallons. In addition, the basin 14 has a drain valve 16 with a hose fitting attached to its wall or base. The basin 14 is secured upon a steel framework 18 and enclosed in a decorative skirt 20 of wood, metal, or plastic varying in height from approximately six (6") inches to approximately two (2') feet, encircling the circumference of the basin 14.

Flush with the top of the decorative skirt 20 runs a drainage trough circling the inner circumference of the decorative skirt 20. The trough can be replaced with individual grates 22 in some embodiments. The trough or grate 22 has an internal return pipe at one end that transfers water from the trough down to the basin 14 resting in the middle of the display. The top of the trough is covered by the decorative grate 22 set in a plastic or metal drain that forms an inset approximately three (3") inches to twelve (12") inches in width. From the inner edge of the inset rises a display face constructed of wood, metal, or plastic flashing rising to the display top, either straight or tapering inward slightly as it rises, and rising to a height of approximately two (2') feet to approximately eight (8') feet. In some embodiments, the display face rises from the front of the grate 22 with inset channels 24 that hold vertical hydroponic towers 12. In this embodiment, the grate 22 is mostly covered by the face of the display and the vertical towers 12 inset into the display rest on the grate 22 with their faces flush to the face of the display. The display face is fixed to a steel, wooden, or plastic framework. The top of the display can be open or covered by a plastic, wood, or metal decorative top.

The display face of the display can be configured in a number of ways meant to attach hydroponic towers or troughs 12 to the display. In one embodiment, the display face has the inset channels 24 that allow the vertical towers 12 to stand flush with the face of the display. In others, a series of brackets 26 of variable spacing, having flat, upward projecting hooks of metal for attaching vertical hydroponic towers 12 directly to the display. This hook corresponds with the complementary bracket on the backs of the vertical hydroponic towers. When attached, the vertical towers 12 stand upright, with the bottoms of the towers 12 resting on the grate 22 of the inset 24, with one or more brackets 26 securing the tower 12 to the display. In this configuration, the plants growing in the towers face outward, away from the display. Towers 12 can be displayed on one side or both of the display or two displays can be place back to back to display completely encircling the display. Advertisement and information boards can also be attached to these brackets 26 offering information on the produce being marketed. When horizontal troughs are being secured to the display, a framework 30 is secured to the upper display brackets that support the horizontal troughs as a series of tapered shelves, with one end of all the troughs slightly elevated above the other to facilitate drainage. At the depressed end, a square or circular pipe stands vertically, with corresponding ports to receive the draining end of the troughs. The bottom of this drainpipe rests on the inset grate 22 and drains into the internal drainage trough. Depending on the type of display 10, troughs will be displayed as above on both flat sides of the display 10, with informational and advertisement boards displayed on the rounded ends of the display 10.

Irrigation of the displayed plants within the hydroponic produce display apparatus 10 of the present invention is accomplished using a tubing system 32 that rises either from the basin 14 in the display base, or from a three-way "Y" fitting having a valved hose fitting attached on one side, while on the other side interrupting the tubing system 32 above the basin. A pump rests in the basin 14 and pumps water from the basin 14 through a valve and through the "Y" fitting to an ultra violet sterilizer. Water flows through the sterilizer to the top of the display where a "tee" interrupts the irrigation tubing having a valve on both of the downstream ends allowing water to be diverted via valves to two different irrigation structures. The first irrigation structure is employed when vertical hydroponic towers are being displayed. It consists of a ring of irrigation tubing radiating from the center of the display to form a ring around the upper edge of the display backing. Misting, spraying or dripping nozzles are inserted into the irrigation tubing at appropriate intervals so that water is introduced to the tops of the hydroponic towers. The second irrigation option is employed when displaying horizontal hydroponic troughs and consists of a vertical drop-pipe that hangs over the exterior of the display back, on the end of the display that supports the raised ends of the hydroponic or aeroponic troughs. From this pipe feeder tubes emerge horizontally and are inserted into the raised ends of the hydroponic troughs. To the ends of these feeder tubes a variety of spraying, misting, and dripping nozzles can be attached, depending on display crop requirements.

Figure 11:
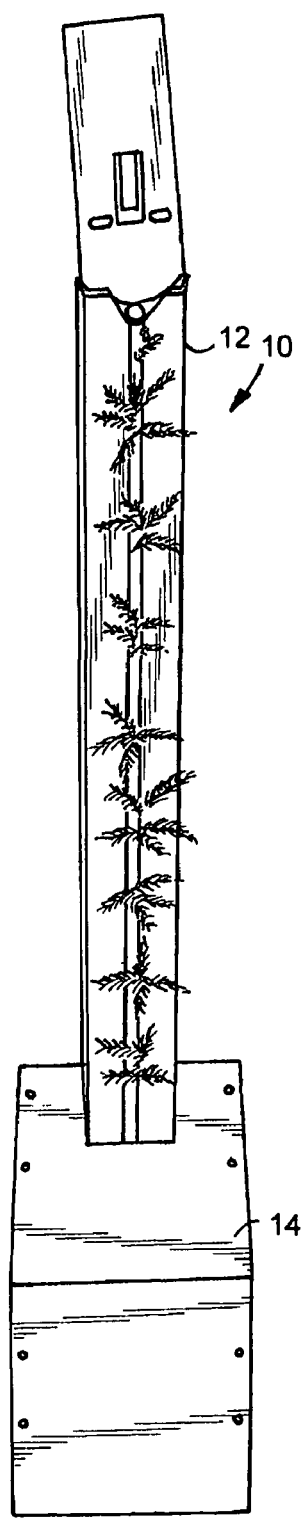
FIG. 11 is a front view illustrating still another embodiment of the hydroponic produce display apparatus, constructed in accordance with the present invention.
Figure 12:
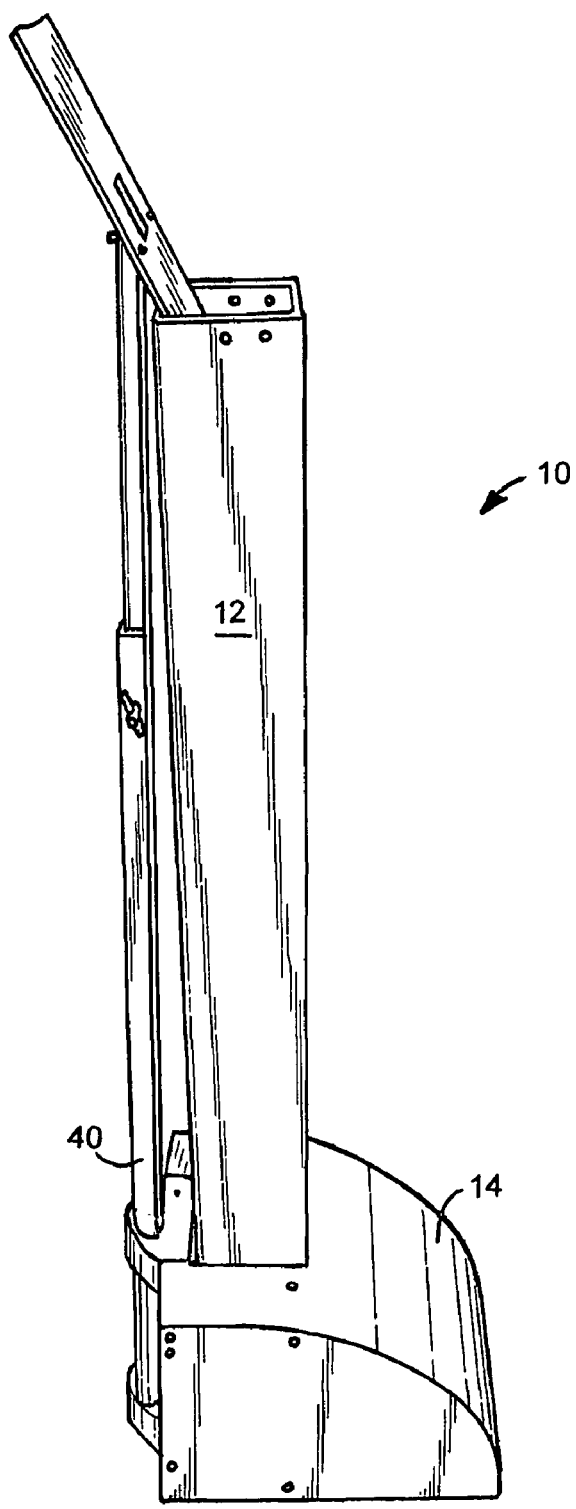
FIG. 12 is side perspective view illustrating the hydroponic produce display apparatus of FIG. 11, constructed in accordance with the present invention.

In another embodiment of the hydroponic produce display apparatus of the present invention, as best illustrated in FIGS. 11 and 12, hydroponic towers only are displayed, being held erect by a support arm 40 of metal attached to a plastic tank base 14. Similarly to the above-described invention, the tower is irrigated from the top and drains into the basin/base 14, which collects the irrigation solution to be pumped back to the top of the tower by a small submersible pump within the basin/base. This base 14 can rest upon a metal stand, rest directly on the floor, or have wheels to make transport easier. The cord for the pump emerges from the rear of the base tank. The base 14 may or may not have a cover for aesthetic appeal or to control algal growth within the base tank 14. This particular embodiment is also well-suited to dual use for home hydroponic production as well as plant preservation and display.

The hydroponic produce display apparatus 10 of the present invention has the potential to dramatically increase both the shelf life and quality of produce at market as well as change consumer experiences at market. The apparatus 10 takes advantage of modularity in hydroponic production systems to introduce a new means of marketing produce to consumers, and to offer new methods incentives for wholesale and retail marketers to utilize locally-produced vegetables and herbs. Potential markets for the hydroponic produce display apparatus 10 include farmer's market retailers, commercial and restaurant kitchens, grocery stores and specialty crop stores as well as home produce consumers.

The hydroponic produce display apparatus 10 of the present invention is unique in form and function over traditional display technology has consisted of bins or containers with doors since the apparatus 10 is constructed to form a housing that incorporates unharvested plant propagation containers. It functions as a life-support system for hydroponic produce. The irrigation system 32 is essential to the function of the display allowing at-market displays that irrigate the roots of unharvested, living vegetables. The hydroponic produce display apparatus 10 is unique in application resulting in tangible benefits that offer a distinct advantage over the use of traditional bin and refrigerated displays, including elimination of spoilage (produce has an indeterminate shelf life), elimination of refrigeration costs (energy and equipment), allowing secondary use and distribution of uncut produce (eliminating another source of waste for producers), and elimination of most packaging and harvest-related labor costs for producers. The hydroponic produce display apparatus 10 provides either horizontal or vertical brackets or channels to retain horizontal or vertical plant production equipment and is essentially a storage device as much as a display device eliminating the need for refrigeration. Towers and troughs are exchanged by the producer on a regular basis with harvested containers being removed, and unharvested containers being installed in the hydroponic produce display apparatus 10.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A hydroponic produce display apparatus for in-store and market display of plants, the hydroponic produce display apparatus comprising:

a basin roving an open top, the basin holding a volume of liquid;

a cover positioned on the open top of the basin, the cover being permeable to liquid;

a display backing having a first end, a second and opposite the first end, a first side, and a second side opposite the first side, the first end of the display backing mounted over the open top of the basin, the display backing extending vertically from the basin;

a plurality of vertical hydroponic towers, and wherein the display backing has inset channels allowing the plurality of vertical hydroponic towers to be inserted within the inset channels and stand flush with the face of the display backing;

mounting means cooperating with the display backing for mounting the plants to the display backing;

liquid introduction means for introducing liquid to the plants mounted to the display backing; and liquid transfer means for moving liquid from the basin to the liquid introduction means;

wherein excess liquid from the liquid introduction means not absorbed by the plants moves into the basin for transfer back to the liquid introduction means.

2. The hydroponic produce display apparatus of claim 1 and further comprising:

a decorative skirt completely surrounding the basin and extending above the open top of the basin thereby concealing the basin from view.

3. The hydroponic produce display apparatus of claim 2 wherein the cover is a drainage trough circling an inner circumference of the display skirt.

4. The hydroponic produce display apparatus of claim 1 wherein the cover is at least one grate covering the basin, the display backing extending from the basin.

5. The hydroponic produce display apparatus of claim 1 wherein the display backing is mounted on a fixed framework.

6. The hydroponic produce display apparatus of claim 1 wherein the liquid introduction means is a series of overhead sprayers mounted on the second end of the display backing for introducing liquid into each of the vertical hydroponic towers.

7. The hydroponic produce display apparatus of claim 1 wherein the mounting means is a series of brackets of variable spacing, having flat, upward projecting hooks for attaching vertical hydroponic towers directly to the display face, each hook corresponding with a complementary bracket on the back of the vertical hydroponic tower wherein when attached, the each of the vertical hydroponic towers stand upright, with the bottoms of the vertical hydroponic towers resting on the inset, with one or more brackets securing the vertical hydroponic tower to the display backing such that the plants growing in the vertical hydroponic towers face outward, away from the display backing.

8. The hydroponic produce display apparatus of claim 7 wherein hydroponic vertical towers are displayed on the display face selected from the group consisting of one side of the display face, both sides of the display face, and completely encircling the display face.

9. The hydroponic produce display apparatus of claim 1 and further comprising:

informational and advertisement boards mounted to the display apparatus.

10. The hydroponic produce display apparatus of claim 1 wherein the display apparatus supports the irrigation and display of discreet, modular hydroponic production containers in various forms, including nutrient film technique troughs, drip technique troughs, aeroponic tubes, and vertical hydroponic towers.

\* \* \* \* \*